3,069,393
N-ACELYLATED POLYCARBONAMIDES
Curtis Wayne Stephens, Claymont, Del., assignor to E. I. du Pont de Nemours and Company, Wilmington, Del., a corporation of Delaware
No Drawing. Filed Nov. 2, 1959, Ser. No. 850,043
8 Claims. (Cl. 260—78)

This invention relates to novel and useful polyamides and to a process for their production.

Polyamides of relatively high molecular weight have been found to be extremely useful in the production of fibers and other articles having outstanding characteristics. For some end uses, it is desirable that these polymers have a fairly high melting point so that the finished article does not soften or melt during ironing or other high temperature treatment. However, in certain end uses where the strength and other desirable characteristics of polyamide structures would be very useful, a relatively low melting point is desired. For instance, it has recently been found that high grade papers may be made of certain synthetic fibers, provided that a small amount of a lower melting component is added to act as a binder when the structure is subjected to a temperature high enough to melt the low melting component but below the melting point of the main body of the fiber. Without such binders, most synthetic fibers do not make satisfactory papers. A polyamide having relatively high molecular weight and low melting point would be highly desirable, particularly in the preparation of such papers.

It is an object of the present invention to provide novel and useful polyamides and a process for their production. Another object is to provide polyamides having relatively high molecular weights but lower than normal melting points.

The above objects are accomplished according to the invention by a polyamide in which the amide groups thereof are linking units between divalent hydrocarbon bonds and in which acetyl radicals are attached to at least about 10% of the amide nitrogens. Preferably, at least 25% of the amide nitrogens are substituted.

The novel process for preparing these polymers comprises reacting acetic anhydride with a polyamide in which at least about 10% of the amide nitrogens, preferably substantially 100% are available for reaction, i.e., having hydrogen atoms attached, in a reaction solvent medium containing lithium chloride in a minor proportion, preferably between about 5 and about 20%, and a solvent such as dimethylformamide or dimethylacetamide.

The reaction is preferably carried out in the presence of an acid acceptor which does not react with acetic anhydride since the build-up of acetic acid in such a reaction causes degradation of the polymer. While any weakly basic compound which is soluble in the reaction mixture and which does not react with the acetic anhydride may be employed, tertiary amines such as triethylamine are preferred.

The polyamide is heated to effect solution in the solvent, the temperature and time required being dependent on the polyamide selected and the amount of lithium chloride in the solvent medium; larger amounts of lithium chloride usually facilitate solution of polymer at lower temperatures.

It is usually desirable to use a substantial excess of acetic anhydride over that theoretically required to produce the desired degree of substitution. Additional heating is usually required during and after the addition of the acetic anhydride, the temperature and time being dependent on the polyamide and the degree of substitution desired.

*Example I*

Fifteen grams of lithium chloride are dissolved in 100 ml. of dimethylformamide. To this solution is added 20 grams of polyhexamethylene adipamide having an inherent viscosity of 1.13 at 30° C. in meta-cresol (0.5 g./100 ml. solvent). This mixture is then heated until the polyhexamethylene adipamide is completely dissolved, at which time the temperature is about 125° C. After the solution is cooled to a temperature of 85° C. and 21 ml. of triethylamine is added, it is then heated to 90° C. and 13.5 ml. of acetic anhydride is added dropwise with continued heating. The temperature after the addition of the acetic anhydride is 120° C. and this temperature is maintained for an additional 10 minutes. The polymer is then precipitated by pouring the solution into several hundred ml. of water after which the polymer is filtered off, washed with water, then with acetone, and permitted to dry. The melting point of the final polymer is 190° C. as compared to 260° C. for the original polyhexamethylene adipamide. The oxygen content of the final polymer was determined by the well-known combustion method in the conventional manner and found to be 15.91%, indicating the presence of acetyl groups on 26.6% of the amide nitrogens. Infrared measurements carried out in the conventional manner showed a characteristic peak at 5.91 microns, confirming the presence of acetyl groups in the polymer.

*Example II*

The N-acetyl polyamide of Example I, in an amount of 10 grams, is dissolved in 190 grams of dimethylformamide by heating to a temperature of 115° C. To 40 grams of this solution is added, in a fine stream, 400 ml. of water in a one quart capacity Waring Blender running at high speed. The resulting polymer particles are washed and combined with ¼ inch, 1.5 d.p.f. (denier per filament) polyhexamethylene adipamide fibers to give a blend containing 30% of the N-acetyl polyamide and 70% of polyhexamethylene adipamide fibers. A hand sheet is prepared from a slurry of these fibers in the conventional manner. The hand sheet is dried and pressed at 195° C. and 625 p.s.i. pressure to form a synthetic paper. The resulting sheet has a dry tensile strength of 13.1 lbs./in./oz./sq. yd., wet tensile strength at 70° F. of 7.7 lbs./in./oz./sq. yd. and a torque tear strength of 0.83 lb./oz./sq. yd.

Among the polyamides which are suitable for use in the preparation of the N-acetyl polyamides of this invention are those disclosed and claimed in U.S. Patents 2,071,253, 2,130,523, and 2,163,636. The preferred polyamides for use in the present process are those derived from hexamethylene diamine and adipic acid, and polycaproamides derived from 6-aminocaproic acid.

I claim:

1. As a novel composition of matter, a fiber-forming, synthetic, linear polycarbonamide having acetyl radicals substituted on at least about 10% of the amide nitrogens.

2. The novel composition of claim 1 wherein the acetyl radicals are substituted on at least about 25% of the amide nitrogens.

3. The novel composition of matter of claim 2 wherein the polycarbonamide is polyhexamethylene adipamide.

4. The novel composition of matter of claim 2 wherein the polycarbonamide is polycaproamide.

5. The novel process which comprises adding a fiber-forming, synthetic, linear polycarbonamide to dimethylformamide containing a minor proportion of lithium chloride; heating the mixture to form a solution at a temperature of about 125° C.; cooling said solution to about 85° C.; adding triethylamine to said solution;

heating the solution to about 90° C.; adding acetic anhydride to said solution, whereby the solution temperature increases to about 120° C., and maintaining this temperature for about 10 minutes to provide a partially acetylated polycarbonamide.

6. The novel process of claim 5 wherein the polycarbonamide and acetic anhydride are present in substantially equimolar proportions.

7. The process of claim 6 wherein the polycarbonamide is polyhexamethylene adipamide.

8. The process of claim 6 wherein the polycarbonamide is polycaproamide.

References Cited in the file of this patent

UNITED STATES PATENTS

| 2,387,530 | Prichard | Oct. 23, 1945 |
| 2,525,753 | Yutzy et al. | Oct. 10, 1950 |

FOREIGN PATENTS

| 532,674 | Great Britain | Jan. 29, 1941 |